US011882964B2

(12) United States Patent
Tanaka et al.

(10) Patent No.: US 11,882,964 B2
(45) Date of Patent: Jan. 30, 2024

(54) AUTOMATED FRYING SYSTEM

(71) Applicant: LAB2FAB LLC, Fremont, CA (US)

(72) Inventors: Samuel Lewis Tanaka, San Leandro, CA (US); Hogan Hall Hempy, Pleasanton, CA (US); Peter Elliot Ishiguro, San Jose, CA (US); Shawn Michael Lange, Walnut Creek, CA (US); Cory David Lent, Campbell, CA (US); John Paul Norman, San Jose, CA (US)

(73) Assignee: Lab2Fab. LLC, Fremont, CA (US)

(*) Notice: Subject to any disclaimer, the term of this patent is extended or adjusted under 35 U.S.C. 154(b) by 0 days.

(21) Appl. No.: 17/494,664

(22) Filed: Oct. 5, 2021

(65) Prior Publication Data
US 2022/0104659 A1 Apr. 7, 2022

Related U.S. Application Data

(60) Provisional application No. 63/088,162, filed on Oct. 6, 2020.

(51) Int. Cl.
*A47J 37/12* (2006.01)
*A23L 5/10* (2016.01)
(Continued)

(52) U.S. Cl.
CPC ............. *A47J 37/1228* (2013.01); *A23L 5/11* (2016.08); *A47J 37/1219* (2013.01); *B25J 5/04* (2013.01); *B65G 47/90* (2013.01)

(58) Field of Classification Search
CPC .... A47J 37/1228; A47J 37/1219; A47J 44/00; A47J 27/00; A47J 36/06; A47J 36/34; A47J 37/128; B25J 11/0045
(Continued)

(56) References Cited

U.S. PATENT DOCUMENTS 4,483,550 A * 11/1984 Dubbe ................. B60D 1/025
411/351
11,167,421 B2 11/2021 Sinnet et al.
(Continued)

FOREIGN PATENT DOCUMENTS

EP 3861906 A4 11/2021
WO 2008144824 A1 12/2008
WO 2018165105 A1 9/2018

*Primary Examiner* — Phuong T Nguyen
(74) *Attorney, Agent, or Firm* — Van Hoven PC; Stefan D. Osterbur

(57) ABSTRACT

Systems, devices, and methods are directed to automated preparation of food or consumable items, such as for preparation of fried foods. An example cooking apparatus may include processing devices for the consumable items. In some examples, a robot arm is provided that extends from a moveable base. Locators may define a relative position of the moveable base relative to processing device(s) of the cooking apparatus, such that the robot arm is configured to determine robot arm movements to move the consumable items to and from the processing device(s). In some examples, one or more zones may be used to detect movement near a robot arm, with one or more restrictions being placed upon robot arm and/or base movement in response. In some examples, a cooking apparatus provides automated transport of food ingredients for preparation of food or other consumable items.

18 Claims, 11 Drawing Sheets

(51) Int. Cl.
*B65G 47/90* (2006.01)
*B25J 5/04* (2006.01)

(58) Field of Classification Search
USPC ......... 99/325, 326, 357, 334, 339, 352, 358, 99/355, 403, 443, 494, 451; 426/274, 426/275, 574, 629, 641, 656, 634, 426/516–519, 531
See application file for complete search history.

(56) References Cited

U.S. PATENT DOCUMENTS

| | | | |
|---|---|---|---|
| 2017/0305015 A1* | 10/2017 | Krasny | B25J 9/1666 |
| 2019/0176338 A1 | 6/2019 | Zito et al. | |
| 2019/0261566 A1* | 8/2019 | Robertson | G06F 18/24323 |
| 2020/0046169 A1 | 2/2020 | Jeongwoo et al. | |
| 2020/0047349 A1* | 2/2020 | Sinnet | A47J 37/1266 |
| 2022/0055225 A1 | 2/2022 | Sinnet et al. | |

* cited by examiner

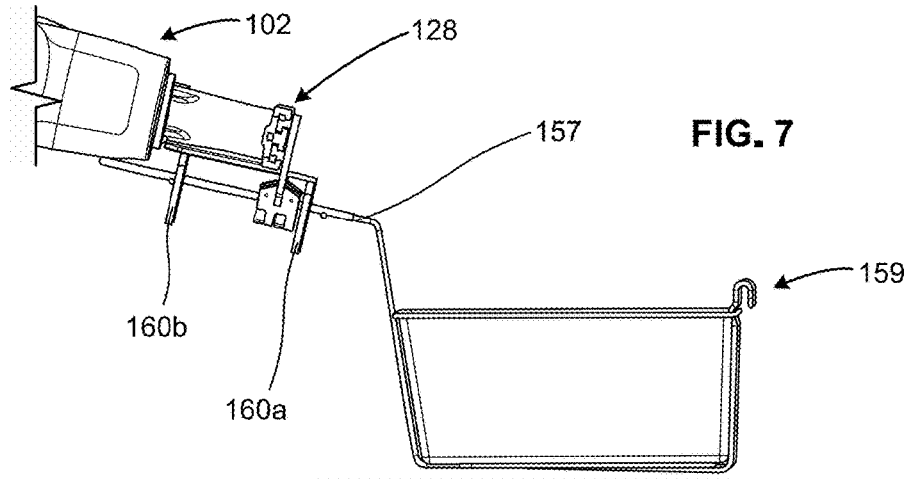
FIG. 7
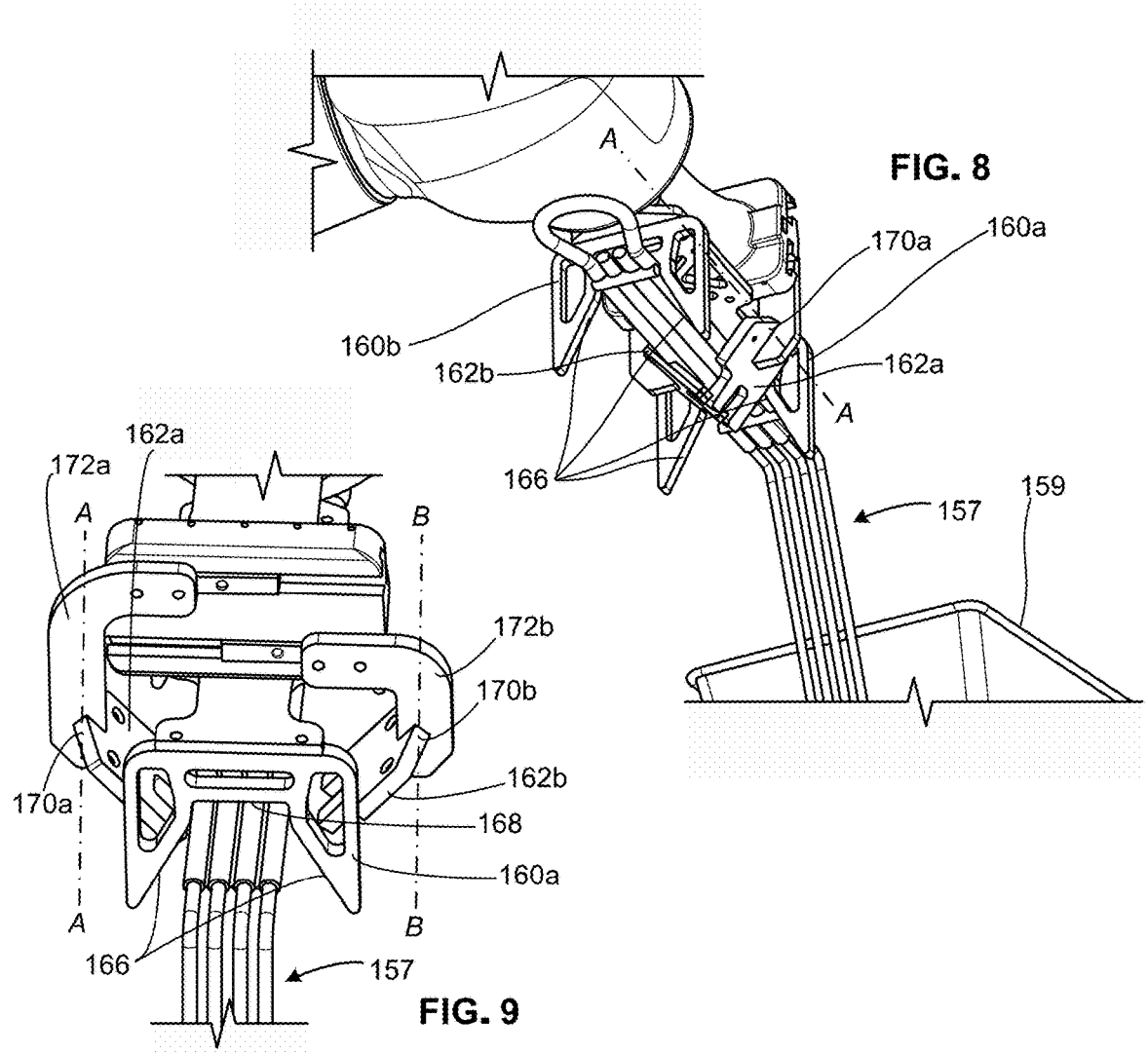
FIG. 8
FIG. 9

AUTOMATED FRYING SYSTEM

CROSS-REFERENCE TO RELATED APPLICATIONS

This application claims priority to U.S. Provisional Patent App. Ser. No. 63/088,162, filed on Oct. 6, 2020, the entire contents of which are hereby expressly incorporated by reference in their entirety.

BACKGROUND

The restaurant and hospitality industries are high-risk business propositions. There is a very high level of competition and extensive details to perfect to ensure that food and beverage service establishments become successful. In addition, the business is stressful, noisy, involves perishable items that are easily damaged, and depends on numerous variables such as high-turnover employees, supply chains, competitive conditions, industry trends, fickle consumer tastes, and the like. Many restaurant businesses are unable to balance both the numerous external variables that impact the business and the strict requirements for in-house operational excellence. As a result, most restaurants either fail within the first year of operation or have a minimal period of profitability before they quickly face obsolescence as a result of new entrants.

With rising employee and operations costs, restaurants are increasingly employing software suites and automation in order to streamline and improve operations. There is a continuing need to automate food preparation activities that are difficult, complex, and/or dangerous, e.g., due to elevated temperatures of cooking oil.

SUMMARY OF THE INVENTION

In at least some example approaches, an automated food preparation system includes a cooking apparatus configured to cook consumable items. The cooking apparatus includes at least first and second processing devices for the consumable items, with the first and second processing devices being mounted to a reference frame. The system may also include a robot arm extending from a moveable base configured to be mounted to the first processing device in a mounted orientation defined by first and second locators. The first and second locators define a horizontal position of the moveable base relative to the first processing device. The robot arm is configured to determine robot arm movements to move the consumable items to and from the first processing device.

In at least some example illustrations, a method for automated food preparation includes providing a cooking apparatus configured to cook consumable items. The cooking apparatus may include at least first and second processing devices for the consumable items. The method also includes mounting the first and second processing devices to a reference frame, defining a fixed horizontal relationship of a moveable base of a robot arm relative to the first processing device with first and second locators. The robot arm is configured to determine robot arm movements to move the consumable items to and from the first processing device.

In at least some example approaches, an automated food preparation system includes a cooking apparatus configured to cook consumable items. The cooking apparatus includes at least first and second processing devices for the consumable items, with the first and second processing devices being mounted to a reference frame. The system also includes a robot arm extending from a moveable base configured to be mounted to the first processing device in a mounted orientation. The robot arm is positioned within a horizontal robot movement zone encompassing a field of movement of the robot arm. The system also includes a first horizontal safety zone and a second horizontal safety zone, each outside the horizontal robot zone. The second horizontal safety zone is positioned between the first horizontal safety zone and the horizontal robot movement zone. The robot arm is configured to reduce a robot arm movement speed in response to a first detection of a human movement into the first horizontal safety zone, and to further reduce a robot arm movement speed in response to a second detection of a human movement into the second horizontal safety zone.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 7 shows a side view of an end effector for the robotic arm of FIG. 2 or the robotic arm of FIGS. 3-6, in accordance with an embodiment of the present disclosure;

FIG. 8 shows a rear lower perspective view of the end effector of FIG. 7, in accordance with an embodiment of the present disclosure;

FIG. 9 shows a front upper perspective view of the end effector of FIG. 7, in accordance with an embodiment of the present disclosure;

DETAILED DESCRIPTION

Figure 1:
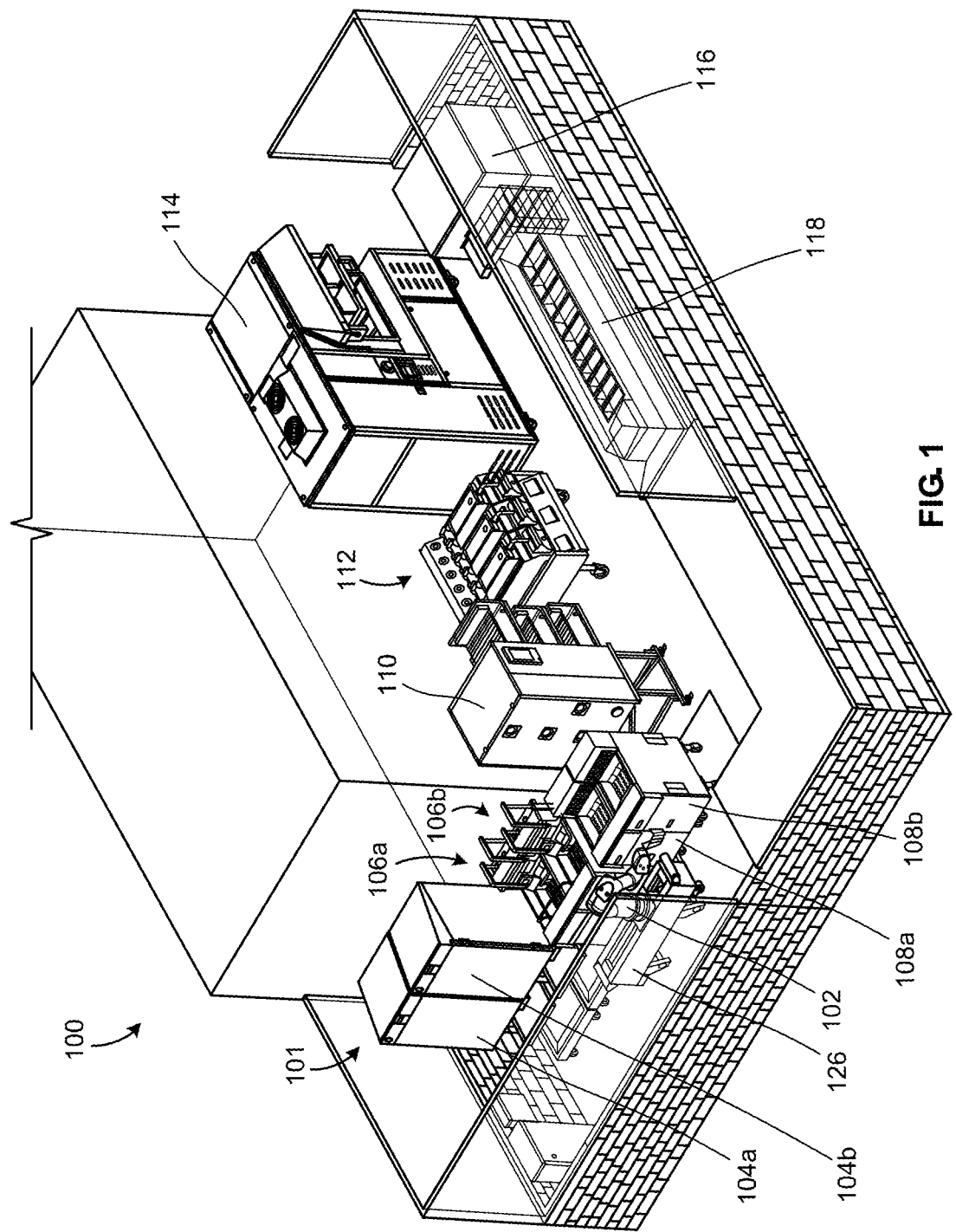
FIG. 1 shows a perspective view of a kitchen including an automated food preparation system having a robotic arm, in accordance with an embodiment of the present disclosure.

In example systems, devices, and methods described herein, cooking processes such as may be used in production of fried consumable items or food may be automated. Example approaches may generally be directed to one or more processing devices in a cooking apparatus. The processing devices may include, but are not limited to, ingredient storage areas and cooking devices such as fryers. Processing devices may also include finishing areas that may provide heat to cooked food to maintain warmth or complete preparation. Further, the finishing areas may facilitate seasoning or collection of food items into serving containers.

Generally, automation of deep-frying operations presents difficulties due to the relatively extreme heat applied by commercial-size quantities of cooking oil and the need to facilitate maintenance and cleaning, among other challenges. In an example cooking apparatus, a robot arm is movably mounted, e.g., to a rail, such that a moveable base positions the robot arm. The rail or other moving apparatus may be removable from the cooking apparatus to facilitate cleaning and/or maintenance. However, example robot arms generally must also be provided with accurate location data or information about the processing devices about which the robot arm and/or base are moving, as well as locations of processing locations for the consumable items (e.g., location of a cooking oil or medium into which food ingredients are placed, location of ingredient storage or finishing areas to which food ingredients are delivered, etc.). Accordingly, a plurality of locators may be provided to define a relative position of the rail and/or moveable base relative to processing device(s) of the cooking apparatus. Accordingly, the robot arm may generally determine robot arm movements, e.g., along the rail or of joints/members of the robot arm, to move the consumable items to and from the processing device(s).

In some examples, a scanner or sensor may be used to detect movement near a robot arm in a cooking apparatus. A robot arm and/or rail may be provided with one or more movement restrictions in response to a detection of movement in a first zone within which the robot arm is moving. Beyond the robot movement zone, additional zone(s) may be monitored for movement, with other restrictions placed upon movement of a robot arm and/or rail in response to detections of movement in the additional zone(s). In some examples, an initial restriction such as a reduction in speed of the robot arm and/or the rail may be enacted in response to detection of movement in the adjacent zone. A heightened restriction, e.g., a further reduction in speed or stopping motion of the robot and/or rail, may be implemented upon detection of movement within the robot movement zone. The multiple detection zones and levels of restriction may facilitate continued operations despite presence of personnel in nearby working zone, while reducing potential for contact of personnel with moving robots of the cooking apparatus.

In still other examples, automated transport of food ingredients may be provided, e.g., as part of a cooking apparatus configured to prepare fried food such as french fries, onion rings, or the like. As elaborated further below, example transport items may include conveyors, cranes, elevators, lifts, rails, trolleys, and the like. The example transport devices may, similar to examples employing a robot arm, generally facilitate reduced human workload in a kitchen operation directed to production of fried food or other consumable items.

Turning now to FIG. 1, an example illustration of a partial restaurant operation is illustrated. Restaurant operations are generally divided into front-of-house operations and the back-of-house operations such as the illustrated kitchen operation of FIG. 1. Front-of-house operations may include entry and waiting areas for customers, ordering queues, employee stations, point of sale (PoS) systems, front-of-house employees (e.g., taking orders, delivering food, cleaning), staging areas for completed orders, dining areas, and other related customer-facing facilities and operations based on particular restaurant design and operations. By contrast, back-of-house operations such as illustrated in FIG. 1 generally include a number of stages and types of food storage, numerous racks for temporary storage of inventory to be used in food preparation, various types of food preparation equipment and preparation stations for preparing and combining prepared food items, racks for storage of partially prepared and prepared food items, and numerous employees, to handle food items and equipment from inventory.

Generally, the system 100 includes a back-of-house operation or kitchen for a restaurant, which employs a cooking apparatus 101 and a robotic arm 102. The system 100 may be integrated into any restaurant or kitchen operation. In some example approaches, the system 100 is integrated into a back-of-house operation of a restaurant, examples of which are described in U.S. patent application Ser. No. 16/780,797 and U.S. Provisional Patent Application Ser. No. 62/819,326, and the contents of each of these applications are hereby expressly incorporated by reference in their entireties.

In the example shown in FIG. 1, the system 100 includes refrigerated ingredient storage 104a and 104b, cooking devices 106a and 106b, food ingredient finishing areas 108a, 108b, refrigerated items 110, cooktop 112, warming/short-term storage area 114, dry food ingredient storage 116, and assembly/topping application 118. The system 100 may include any other components or subsystems that are convenient, e.g., freezers or refrigerators, bulk ingredient storage, liquid storage, etc. The back-of-house operations may also include numerous employees and operations that do not directly involve the preparation of food, such as loading areas for receiving inventory, dishwashing and sanitizing stations, storage areas, and offices for administrative employees such as management, accountants, etc.

The cooking apparatus 101 includes a plurality of processing devices for producing food, and in the example illustrated these processing devices include the refrigerated ingredient storages 104a and 104b (collectively, 104), cooking devices 106a and 106b (collectively, 106), and food ingredient finishing areas 108a, 108b (collectively, 108). These processing devices generally represent distinct locations in a process of producing, in this example, fried foods. The robot arm 102 may be used to move or manipulate food ingredients to and from the processing devices of the cooking apparatus 101 to produce cooked food(s) for serving. While the examples that follow illustrate the robot arm 102 in the context of system 100 and cooking apparatus 101, numerous other example approaches will be apparent upon consideration of the present disclosure. Accordingly, implementation of other example systems 100, cooking apparatuses 101, or robot arms 102 are not limited to the production of fried foods.

The cooking devices 106 are described herein as deep fat fryers, i.e., employing a volume of cooking medium, e.g., vegetable oil, peanut oil, or the like, which is heated to cook food ingredients. Food ingredients such as cut potatoes, battered onion rings, or the like, may be kept in refrigerated ingredient storage 104 and delivered to the fryers 106 and/or finishing areas 108 by robot arm 102. Upon completion of cooking the food ingredients, the robot arm 102 may move the food ingredients from the fryers 106 to the finishing areas 108. In the finishing areas 108, the cooked ingredients may be seasoned or otherwise finished. The finishing areas 108 may also have heating elements, lamps, or the like to keep the cooked food warm to allow serving on demand. Personnel in the kitchen operation 100 may collect the cooked food, e.g., in serving containers.

The robot arm 102 may be any robot capable of moving and manipulating food ingredients amongst the processing devices, i.e., the ingredient storage 104, cooking devices 106, and/or finishing areas 108. In the illustrated example seen in FIGS. 1-3, the robot arm 102 includes a plurality of rigid arm members 120 connected by respective joints 122. The robot arm 102 extends from a base 124, which is configured to move along a rail 126. The joints 122 are each configured to facilitate movement of an end effector 128 of the robot arm 102 amongst the cooking apparatus 101. For example, each of the joints 122 may be a single or a multi-axis joint allowing relative rotation between adjacent arm members 120. The joints 122 and arm members 120 cooperate with the sliding base 124 to provide multi-axis freedom of movement of the end effector 128 within the cooking apparatus 101.

Robot Arm Locating

Figure 2:
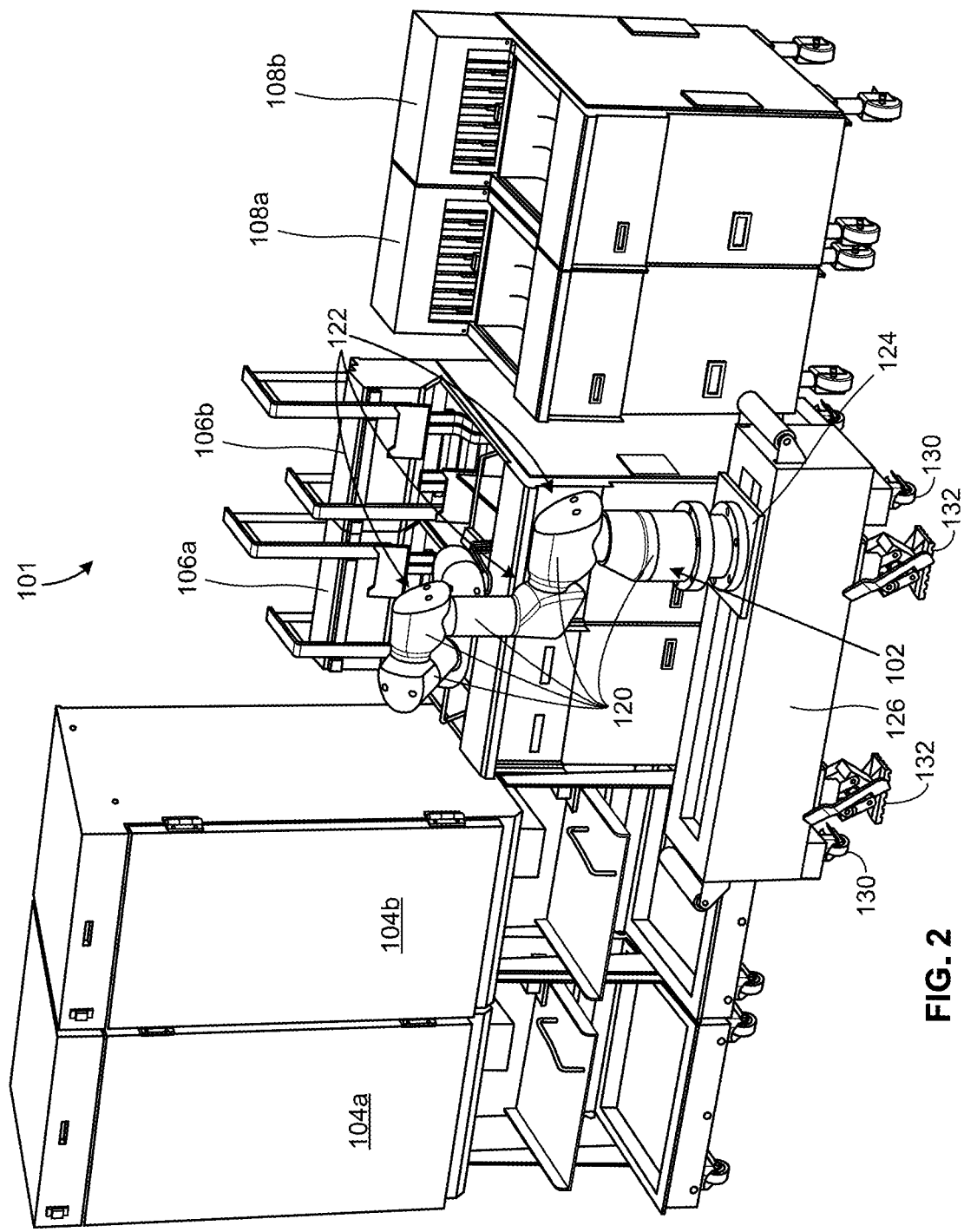
FIG. 2 shows another perspective view of the automated food preparation system and robotic arm of FIG. 1, in accordance with an embodiment of the present disclosure.
Figure 3:
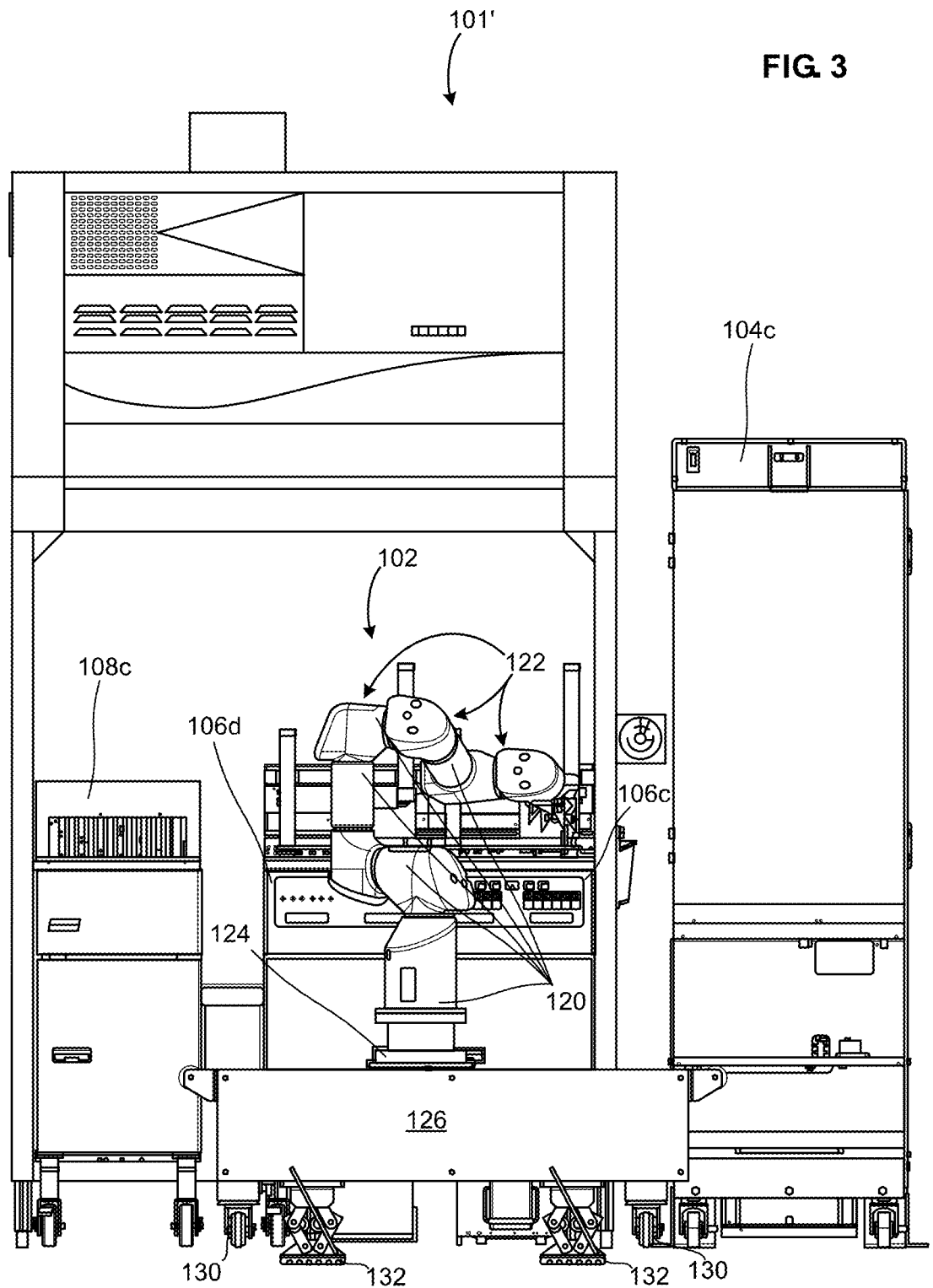
FIG. 3 shows a front view of another automated food preparation system having a robotic arm, e.g., for use in the kitchen of FIG. 1, in accordance with an embodiment of the present disclosure.

Referring now to FIGS. 2 and 3, the rail 126 is described in further detail. The rail 126 is illustrated in two separate example cooking apparatuses 101 and 101' in FIGS. 2 and 3, respectively. Generally, the rail 126 provides a fixed location from which the robot arm 102 extends and moves an end effector 128, e.g., to move food and/or ingredients amongst processing devices or locations of the cooking apparatuses 101 and 101'. The rail 126 includes rollers 130, which may facilitate rolling movement of the robot arm 102 along a floor or ground surface, e.g., away from the cooking apparatuses 101, 101' for cleaning, maintenance, or the like. The rail 126 also includes lifts 132 at each end, which generally lift the rail 126 to prevent movement of the rail 126 along the ground/floor surface via the rollers 130.

While the robot arm 102 is movable via the rail 126 as noted above, it is desirable to fix a relative position of the rail 126 of the robot arm 102 relative to processing devices in a cooking apparatus, e.g., processing devices 104, 106, and/or 108, while the robot arm 102 is operating. In this manner, movements of the robot arm 102 may be controlled to facilitate accurate grasping, manipulation, and delivery of food ingredients within a cooking apparatus. The robot arm 102 may move amongst the processing devices 104, 106, and/or 108 according to a controller, as will be detailed further below. Additionally, it is desirable to allow the robot arm 102 to be moveable with respect to the processing devices 104, 106, and/or 108 to allow cleaning or maintenance of the robot arm 102 and/or the processing devices.

Figure 4:
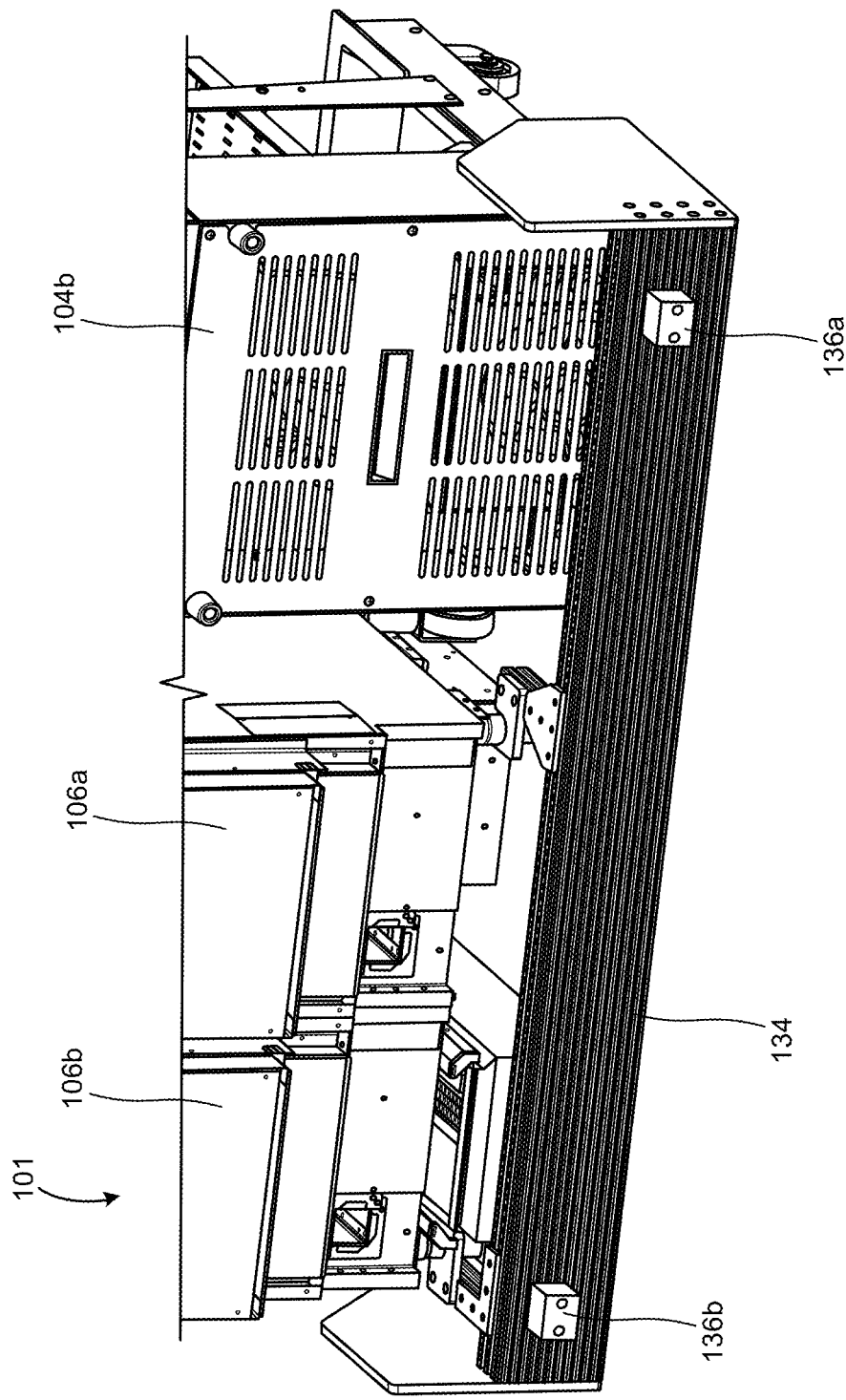
FIG. 4 shows a rear perspective view of the automated food preparation system of FIG. 3, in accordance with an embodiment of the present disclosure.
Figure 5:
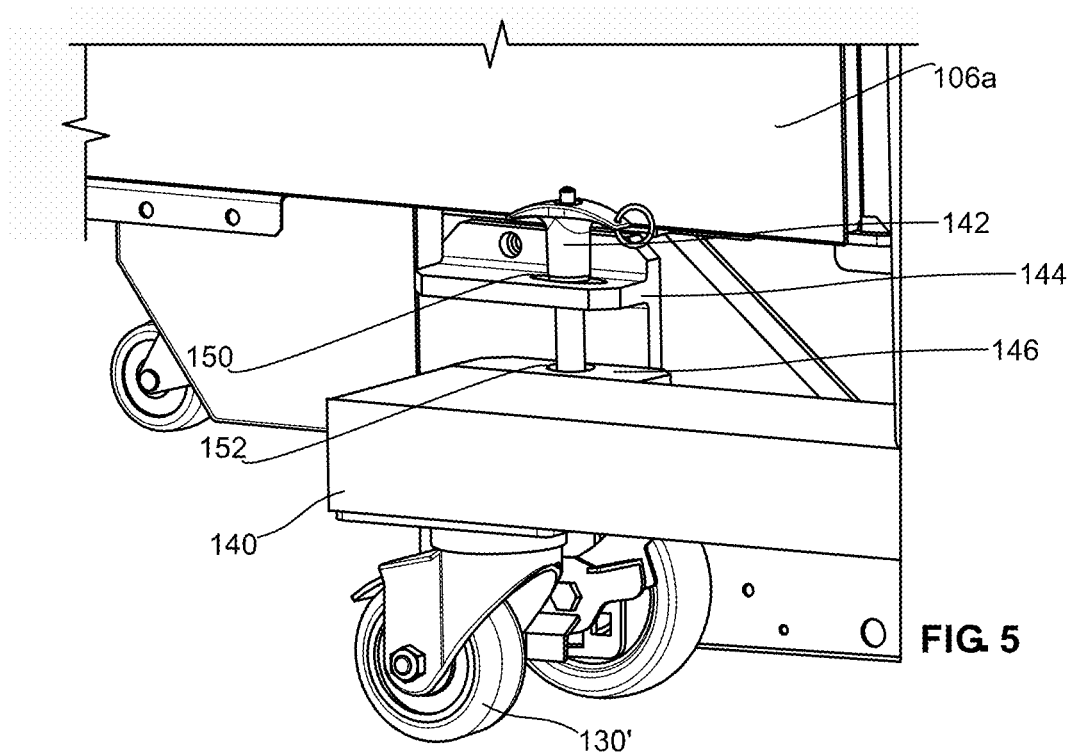
FIG. 5 shows an enlarged side perspective view of the automated food preparation system of FIGS. 3 and 4, in accordance with an embodiment of the present disclosure.
Figure 6:
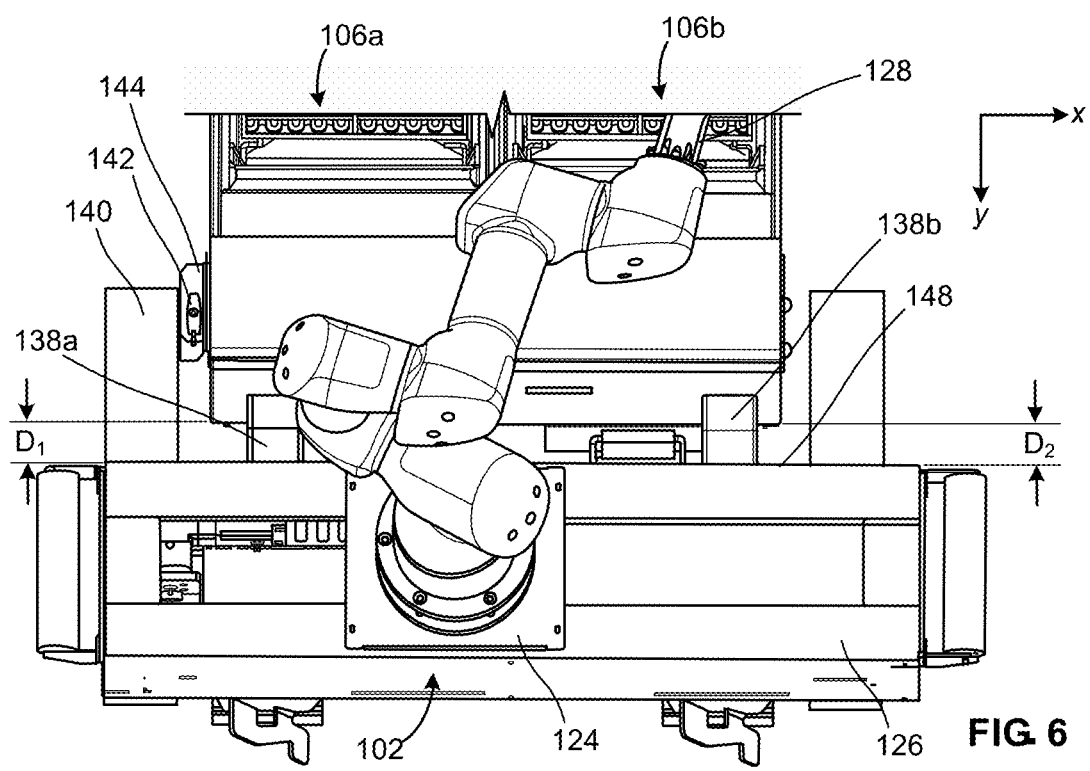
FIG. 6 shows a top perspective view of the automated food preparation system of FIGS. 3-5, in accordance with an embodiment of the present disclosure.

Referring now to FIGS. 4-6, aspects of example cooking apparatuses that facilitate fixing relative positioning of the robot arm 102 and the processing devices 104, 106, and/or 108, are illustrated and described in further detail. As illustrated in FIG. 4, a reference frame 134 is positioned extending along a rear side of the ingredient storage 104b, cooking device 106a, and cooking device 106b. The reference frame 134 generally provides a relative positioning reference for components of the cooking apparatus 101 at least along a horizontal orientation in "x" and "y" directions. The ingredient storage 104b is fixed horizontally to the reference frame 134 with a frame position locator 136a, and the cooking devices 106a, 106b are fixed horizontally to the reference frame 134 with a frame position locator 136b. The frame position locators 136 generally communicate position, e.g., in horizontal (i.e., x and y) space relative to the reference frame 134 to a controller (not shown in FIG. 4). Dimensions and other features of the processing devices 104, 106, and/or 108 may also be stored in a memory of a controller of the robot arm 102.

Referring now to FIGS. 5 and 6, additional locating devices for a cooking apparatus are illustrated and described in further detail. The rail 126 may be positioned horizontally with respect to one or more of the processing devices 104, 106, 108 with horizontal spacers 138a and 138b (collectively, 138), as best seen in FIG. 6. More specifically, the horizontal spacers 138a and 138b are fixed to the cooking device 106a and cooking device 106b, respectively. The horizontal spacers 138 each extend from their respective cooking device 106 to engage a facing surface 148 of the rail 126. The horizontal spacers 138a and 138b define a spacing of the rail 126 from the cooking devices 106 to a fixed distance $D_1$ and $D_2$, respectively. In some example approaches, the horizontal spacers 138 include a magnet, with the facing surface 148 of the rail 126 including a magnetically susceptible material, thereby facilitating a positive engagement between the facing surface 148 of the rail 126 and the horizontal spacers 138.

Additionally, as best seen in FIGS. 5 and 6, the rail 126 includes a fixed extension member 140 that extends from the rail 126 along a side surface of the cooking device 106a. One or more wheels 130' or rollers may support the extension member 140 from a ground surface, e.g., a same ground surface supporting the rollers 130 of the rail 126. A pin 142 extends through a slot 150 that is defined by a locating bracket 144 that is fixed to the cooking device 106a. Additionally, the pin 142 extends through a pinhole 152 defined by a rail extension bracket 146 that is fixed to the extension member 140. The pin 142 thus fixes a position of the rail 126 to the cooking devices 106a and/or 106b in at least one horizontal directions, i.e., x and/or y directions. As best seen in FIG. 5, the slot 150 is slightly elongated in the y-direction (indicated in FIG. 6) in comparison to an outer diameter of the pin 142, thus allowing some movement of the pin 142 within the slot 150 (and thus, the rail 140 relative to the cooking device 106a) in the y-direction. The elongation of the slot 150 may facilitate insertion of the pin 142 into the slot 150 and pinhole 152, to the extent the pinhole 152 does not need to be precisely aligned in order to fit the pin 142 through the slot 150 and into the pinhole 152.

In an example procedure of installing the rail 126 illustrated in FIGS. 5 and 6 to the cooking device(s) 106, the rail 126 may be moved near the cooking device(s) 106 using the wheels 130, bringing the extension member 140 alongside the cooking device 106a. The rail 126 and extension member 140 (which may be fixed relative to the rail 126) may be moved relative to the cooking device(s) 106 to bring the pinhole 152 into alignment or substantially so with the slot 150. The pin 142 may be inserted through the slot 150 into the pinhole 152, thus generally fixing the rail 126 and cooking device(s) 106 in at least one horizontal direction. The rail 126 may then be moved/rotated horizontally along the ground/floor surface relative to the cooking device(s) 106, bringing the facing surface 148 of the rail 126 into contact with the horizontal spacers 138. While the slot 150 is illustrated in the example shown in FIGS. 5 and 6 as being slightly elongated, in other approaches the slot 150 may fit an outer diameter or section of the pin 142 such that the pin 142 controls horizontal position of the rail 126 relative to the cooking device(s) 106 in both horizontal directions, i.e., both x and y directions. (In such examples, only a single horizontal spacer 138 may be needed to fix a position of the rail 126 relative to the cooking device(s) 106 in both horizontal directions.)

With the pin 142 fixing relative horizontal position of the rail 126 and cooking devices 106 at the extension member 146 in at least one direction, and the horizontal spacer(s) 138 fixing a horizontal spacing between the facing surface 148 of the rail 126 and the cooking devices 106, a horizontal positioning of the rail 126 relative to the cooking devices 106 is fixed. Moreover, with a horizontal position of the cooking devices 106 known relative to the reference frame 134 by way of the frame position locator 136b (see FIG. 4), the relative horizontal position of the rail 126 and robot arm 102 are known, e.g., to a controller of the robot arm 102. The moveable base 124 of the robot arm 102 also has a known horizontal position. As such, with the rail of the robot arm 102 fixed via the pin 142 and the horizontal spacers 138, the robot arm 102 is in a fixed or mounted orientation that is defined by the pin 142 and the horizontal spacers 138. In this example, the pin 142 and horizontal spacers 138 define a horizontal position of the base 124 relative to each of the processing devices that are mounted to the reference frame 134. Multiple processing devices, and in some cases all of the processing devices 104, 106, 108 illustrated in FIGS. 1-3, may be mounted to the reference frame 134. As such, movements of the robot arm 102 may be determined for moving consumable items to and from the processing devices 104, 106, 108. Merely as examples, an end effector 128 of the robot arm 102 may grasp food ingredients stored at the food ingredient storage 104a/b and move them into the cooking devices 106a/b for frying. Subsequently, the robot arm 102 may collect the cooked french fries from the fryers 106a/b and move them to the finishing areas 108a/b. It should be noted that while the example rail 126 and cooking devices 106 are illustrated with three horizontal locating devices (i.e., pin 142 and the two horizontal spacers 138), any number of locating devices may be employed that is convenient for fixing a horizontal relationship, i.e., in x and y directions, between the rail 126 and any of the processing devices 104, 106, and/or 108. Vertical alignment of the robot 102 relative to cooking device(s) 106 may be controlled in any manner that is convenient. In the illustrated example, a vertical height of the rail 126 may be set to a desired height from a floor/ground surface, e.g., as set by lifts 132. In one example, the robot base 124 is raised to a height of 22 inches from the floor/ground surface, although any other height may be employed that is convenient. Vertical height of the cooking devices 106 and dimensions thereof may be determined, e.g., from a position indicated by the frame position indicators 136a and/or 136b, or from vertical dimensions of the cooking device(s) 106 from the floor/ground surface.

Figure 15:
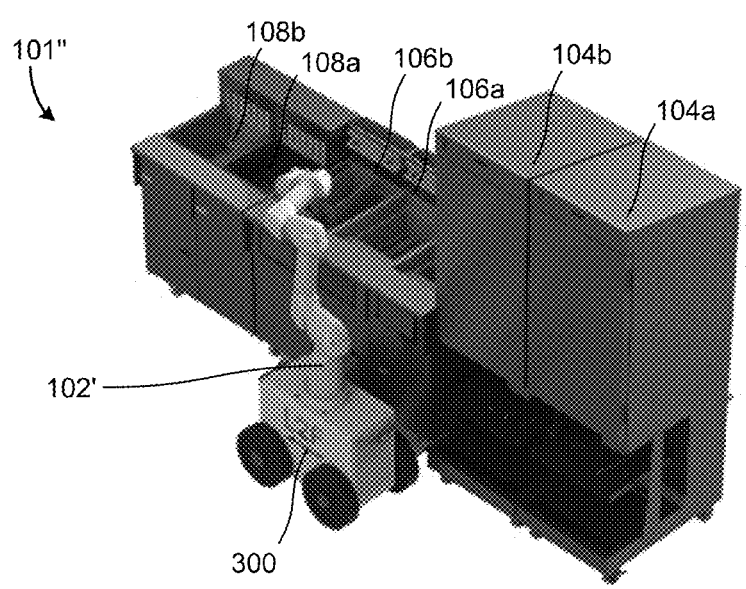
FIG. 15 shows a perspective view of a cooking apparatus having a robot arm positioned upon an autonomous mobile robot, according to an embodiment of the present disclosure.
Figure 16:
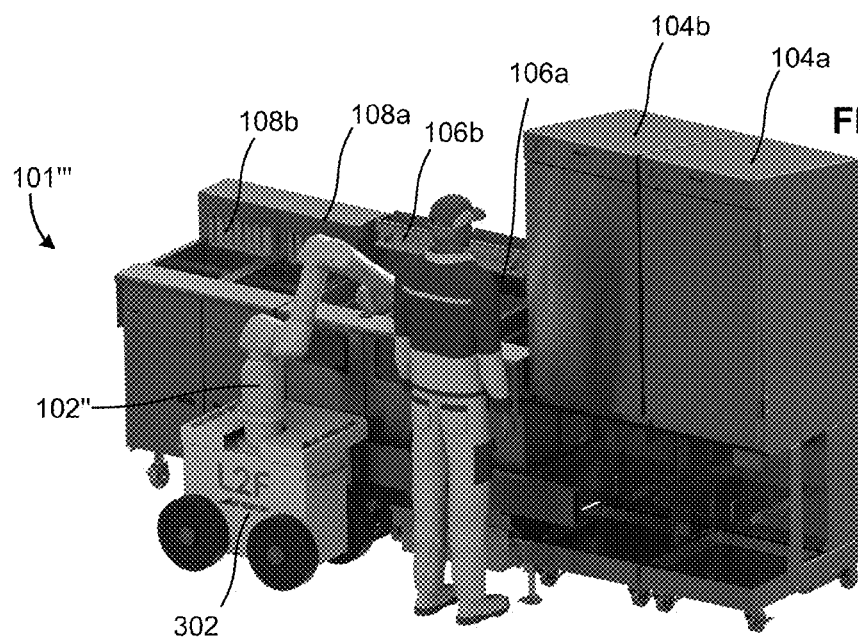
FIG. 16 shows a perspective view of a cooking apparatus having a robot arm positioned upon an automated guided vehicle, according to an embodiment of the present disclosure.

While the foregoing examples generally employ a rail 126 for moving a base 124 of a robot arm 102, it should be noted that robot arms in example approaches may be movably supported in any other manner that is convenient. Merely as examples, in FIG. 15 a cooking apparatus 101" is illustrated that includes a robot arm 102' positioned upon an autonomous mobile robot (AMR) 300. The AMR 300 may be configured to move about a ground or floor surface near/adjacent food ingredient storage areas 104a and 104b, cooking devices 106a and 106b, and finishing areas 108a and 108b. The AMR 300 may be configured to move along/around the cooking apparatus 101" to facilitate a reach of the robot arm 102', e.g., to grasp and move food ingredients to various locations in the cooking apparatus 101". As illustrated in FIG. 16, in another example a robot arm 102" is positioned upon an automated guided vehicle (AGV) 302. The automated guided vehicle 302 may be configured to move the robot arm 102" about the cooking apparatus 101''' and components thereof in similar fashion as noted above for the AMR 300 and/or rail 126. The AGV 302 may generally use fixed routes, wires, guides, rails, or other devices that guide movement of the AGV 302, while the AMR 300 may have cameras, sensors, maps or other means for autonomously guiding the AMR 300. In the examples illustrated in FIGS. 15 and 16, the robots 102' and 102" may determine a location within their respective cooking apparatuses 101" and 102''' using, merely as examples, two-dimensional or three-dimensional light-detection and ranging (LIDAR), laser triangulation, ultrasonic sensors, magnetic tape, line-following, GPS waypoint plotting, and/or guide rails or tracks configured to provide physical guidance.

End Effector

Turning now to FIGS. 7-9, the example end effector 128 of the robot arm 102 is illustrated and described in further detail. Generally, the end effector 128 is configured to grasp a handle 157 of a basket 159. The basket 159 may generally be configured to contain a quantity of food ingredients, e.g., cut potatoes, that may be prepared using the cooking device(s) 106 to make french fries or other fried foods. The end effector 128 is configured to move the basket 159 among processing devices in the cooking apparatus 101 and/or 101'. Merely as examples, the end effector 128 may be configured to manipulate the basket 159 to gather food ingredients from the food ingredient storage 104a/b, deliver the food ingredients to the cooking devices/fryers 106a/b, and to empty the food ingredients at the finishing areas 108a/b. To this end, the end effector 128 may be capable of translating and rotating the handle 157/basket 159 freely, e.g., by way of a joint of the robot arm 102.

In the example illustrated in FIGS. 7-9, the end effector 128 includes two lead-in guides 160a and 160b (collectively, 160) and opposing gripper paddles 162a, 162b (collectively, 162). The end effector 128 may grasp a consumable item carrier arm, e.g., the handle 157 of the basket 159, using the gripper paddles 162 and lead-in guides 160. The gripper paddles 162a and 162b each pivot about pivot points 170a and 170b of end effector brackets 172a and 172b, respectively. Accordingly, the gripper paddles 162 may be placed in a closed position as illustrated in FIGS. 7-9, wherein the handle 157 may be gripped, e.g., to allow moving or rotating the basket 159 by the robot arm 102. More specifically, the gripper paddles 162 generally contact the handle 157 on opposing sides, drawing the handle 157 toward a base 168 of the lead-in guides 160. Opposing ramped surfaces 166 of the lead-in guides 160 generally guide the handle 157 as the gripper paddles draw the handle 157 toward the base 168. More specifically, to any extent the handle 157 is not centered with respect to the base 168, the ramped surfaces 166 may bring the handle 157 to a centered position relative to the base 168, with the handle 157 eventually forced against the base 168 by the gripper paddles 162. The opposing gripper paddles 162 may thus grasp the handle 157 by holding it against the base 168 of the lead-in guides 160. To release the handle 157, the gripper paddles 162 may be pivoted to an open position. More specifically, the gripper paddles 162*a* and 162*b* may be pivoted away from each other about their respective pivot points 170*a* and 170*b*, such that the handle 157 is released. To re-grasp the handle 157 (or grasp a handle 157 of a different basket 159), the robot arm 102 may position the end effector 128 slightly above with the gripper paddles 162 in a relatively opened position. The end effector 128 may then close the gripper paddles 162, bringing the handle 157 against the base 168 of the lead-in guides 160.

Movement Detection Zone(s)

As shown above in FIG. 1, example cooking apparatuses such as the cooking apparatus 101 may be provided in a back-of-house or kitchen system 100 of a restaurant. Generally, it may be desired to integrate the cooking apparatus 101 with other non-automated processes, e.g., preparation of other food/ingredients such as sandwiches, cheeseburgers, drinks, etc. In the example of FIG. 1, personnel or workers in the system 100 may be preparing such other foods in areas of the system 100 at the same time the robot arm 102 is moving about the cooking apparatus 101. Merely as examples, personnel may be moving food ingredients to and/or from refrigerated items 110, cooktop 112, warming/short-term storage area 114, dry food ingredient storage 116, and assembly/topping application 118. Generally, example robot arms 102 may be configured to detect nearby personnel and respond to prevent injury to the personnel if they enter a zone nearby the robot arm 102. In this manner, potential injury to the personnel, e.g., from contact with the robot arm 102 while in motion, may be prevented.

Figure 10:
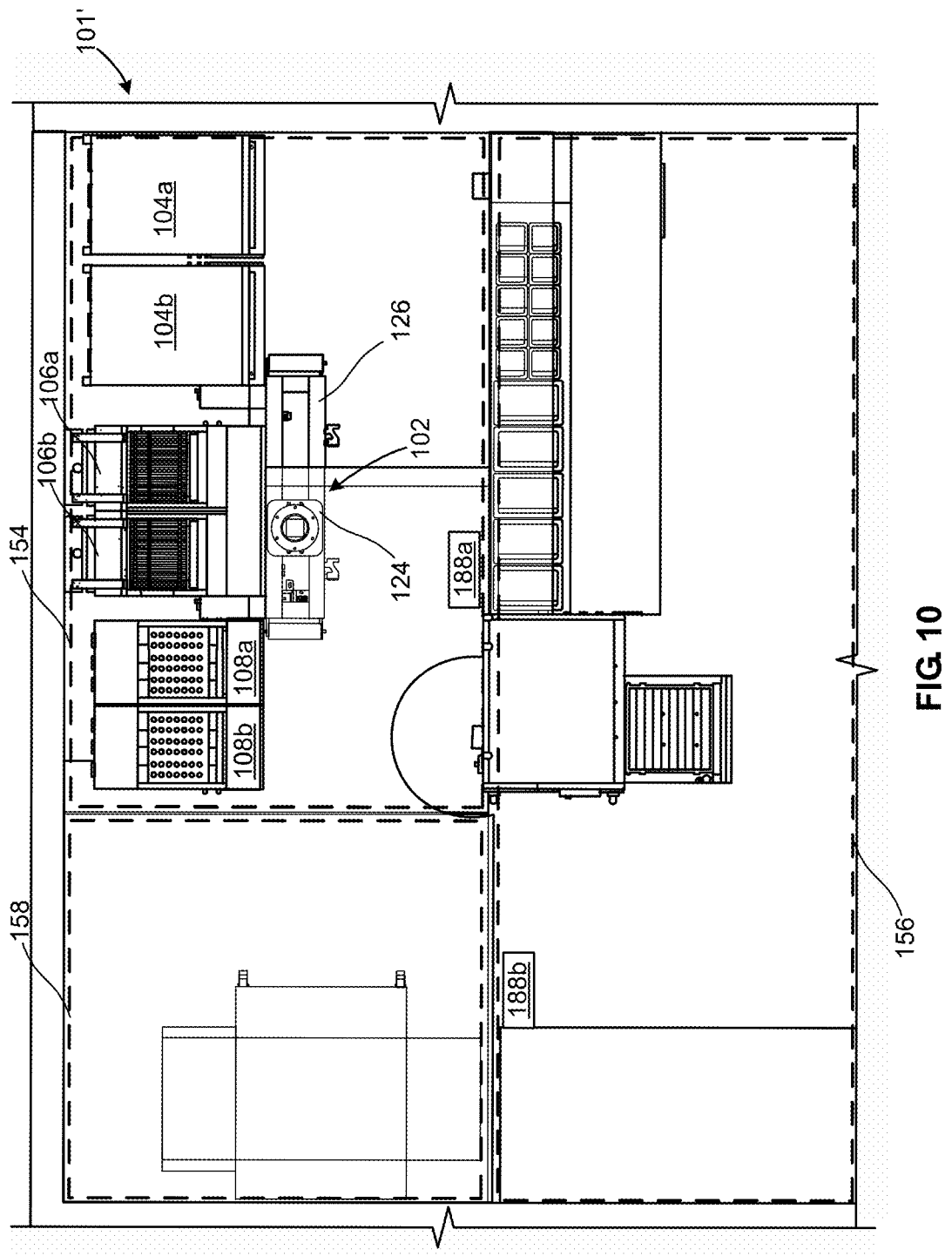
FIG. 10 shows a plan view of a kitchen including an automated food preparation system having a robotic arm and horizontal safety zones, in accordance with an embodiment of the present disclosure.

Referring now to FIG. 10, an overhead view of an example cooking apparatus 101" is illustrated which is configured to detect a presence of nearby humans, e.g., employees of the restaurant system 100'. The cooking apparatus 101" is also configured to respond to the detection of nearby humans or objects to prevent injury or damage. In the illustrated example, upon detection of a nearby human or other moving object, the cooking apparatus 101" may respond by reducing a speed of movement of the robot arm 102 and/or the base 124 along the rail 126. Generally, at all times during operation the cooking apparatus 100" is contained within a horizontally extending robot movement zone 154. In other words, the robot arm 102 does not move outside the robot movement zone 154 as the base 124 moves along the rail 126, and/or the robot arm 102 moves an end effector (not shown in FIG. 10) about the cooking apparatus 101" to move ingredients or food amongst processing devices. For example, as illustrated in FIG. 10 the example cooking apparatus 101" includes ingredient storage 104*a* and 104*b*, cooking devices 106*a* and 106*b* (in the illustrated example, fryers configured to cook ingredients in oil or another cooking medium), and finishing areas 108*a* and 108*b*.

Figure 11:
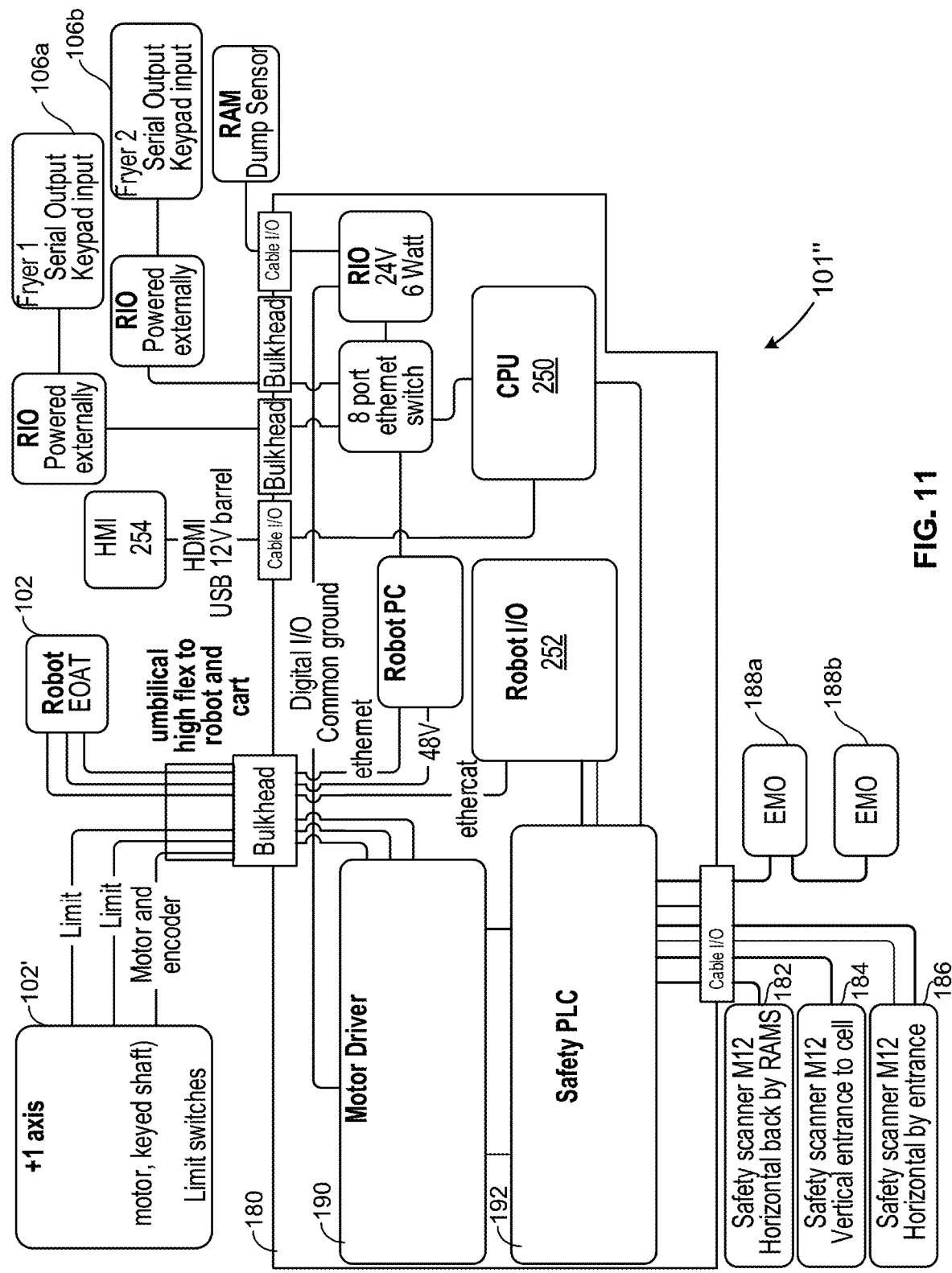
FIG. 11 shows a schematic diagram of the automated food preparation systems illustrated in FIGS. 1-2, FIG. 3, or FIG. 10, according to an embodiment of the present disclosure.

One or more humans or personnel of the system 100 generally remain outside the robot movement zone 154 during operation of the cooking apparatus 100", and more particularly while the robot arm 102 is in motion. In the illustrated example, a safety zone 156 is outside the robot movement zone 154, and personnel of the system 100' generally remain within the safety zone 156. For example, personnel of the system 100 may undertake other tasks directed to preparation of food or ingredients within the safety zone 156. In addition to the robot movement zone 154 and safety zone 156, an additional safety zone 158 may be positioned in between the robot movement zone 154 and safety zone 156. A path into the robot movement zone 154 may be limited such that personnel must pass through the intermediate zone 158 in order to enter the robot movement zone 154. Movement of the robot arm 102 may be restricted, reduced in speed, or stopped altogether depending on movement detected in the intermediate zone 158 or robot movement zone 154, as will be described further below. In some example approaches, upon a subsequent detection that a human has exited the robot movement zone 154 or the intermediate zone 158, the robot arm 102 may be returned to a nominal operating state where normal movement or speed of movement is restored. In some example approaches, different components of a cooking apparatus may have different Accordingly, the system 100' may slow or stop movement of the robot arm 102 in response to a detection of a human or other object entering the intermediate zone 158 and/or the robot movement zone 154, and subsequently begin movement of the robot arm 102 and/or speed up movement of the robot arm 102 upon determining that the human/object is no longer present in the intermediate zone 158 or robot movement zone 154. One or more sensors, cameras, or the like may be provided for detecting movement into and/or out of the robot movement zone 154 and/or the intermediate zone 158 for purposes of determining that a human or an object has entered the robot movement zone 154 and/or the intermediate zone 158. Turning now to FIG. 11, a schematic diagram of the cooking apparatus 100" and associated control system is described in further detail. The cooking apparatus 100", as noted above, includes a robot arm 102 having an end effector (EOAT), and cooking devices 106*a* and 106*b* (e.g., fryers). A motor encoder 102' may be connected with a control system 180. The control system 180 may include a motor driver 190 and a safety processor 192. The safety processor 192 may be linked with a plurality of scanners 182, 184, and 186. The safety processor 192 and computer 250 may generally be in communication via a bus or other communication line, e.g., RS232 modbus or the like. The safety processor 192 may be linked with the robot by way of a robot input/output 252. A human-machine interface (HMI) 254 may be provided for interacting with the cooking apparatus 101", e.g., to power on/off, begin a cooking process, etc. The scanners 182, 184, 186 are each configured to detect movement from the safety zone 156 into intermediate zone 158, as well as movement from the intermediate zone 158 into the robot movement zone 154. Emergency Off (EMO) switches 188*a* and 188*b* may also be provided at one or more locations in the system 100'. For example, as illustrated in FIG. 10 the EMO switch 188*a* may be positioned within the robot movement zone 154, while a second EMO switch 188*b* is positioned outside the robot movement zone 154 and intermediate zone 158. Any other locations for EMO switch(es) may be employed that is convenient. Generally, the EMO switches 188 may be in communication with the safety processor 192 and may deactivate movement of the robot arm 102 and/or rail 126 when actuated, e.g., by personnel in the system 100. Connections of the illustrated components to the control system 180 may be consolidated, e.g., by way of a bulkhead connection point and/or a cable input/output management, as indicated in FIG. 11.

Automated Food Ingredient Transport

Figure 12:
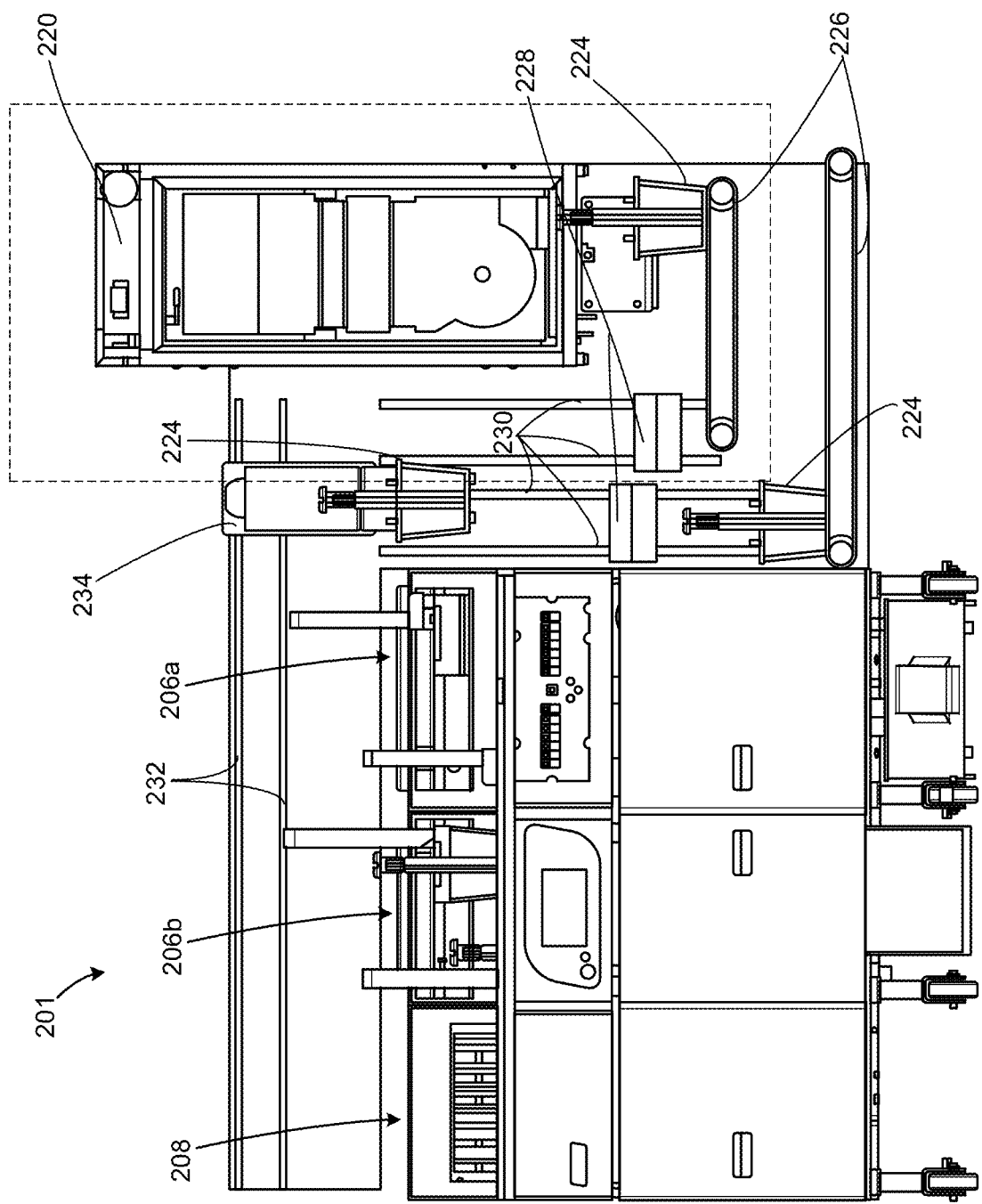
FIG. 12 shows a front view of an automated food preparation system, according to an embodiment of the present disclosure.

Turning now to FIG. 12, another example cooking apparatus 201 is illustrated and described in further detail. The cooking apparatus 201 or features thereof may be implemented in the systems 100 described above. Merely by way of example, the cooking apparatus 201 includes devices for metering ingredients, which may be employed to measure or prepare ingredients from a stock supply. The cooking apparatus 201, as with the systems described above, may generally be directed to preparation of french fries, onion rings, or other foods cooked via frying. Accordingly, the cooking apparatus 201 may include one or more cooking devices 206a and 206b, which may be a fryer configured to cook ingredients in oil or any other convenient medium.

The cooking apparatus 201 may be configured to meter one or more food ingredients from a supply, transport the ingredients to the cooking device 206, and move the ingredients to a finishing area 208. As with the finishing areas 108 discussed above, the finishing area 208 may include a heating device for keeping finished french fries or other fried foods warm.

The cooking apparatus 201 may include a metering device 220, which is configured to measure amounts of food ingredients, e.g., raw or frozen cut potatoes, from an ingredient supply 222. The ingredient supply 222 may be refrigerated and may be loaded from a front panel or from above. The metered ingredients may be output from the metering device 220 and placed or dropped into a basket 224 positioned below the metering device 220. The metering device 220 may operate by any manner that is convenient, e.g., by weight or by volume. The metering device 220 may be a hopper-style device that weighs or dispenses fries or other ingredients. Merely as examples, ingredients may be metered out using a rotational device such as a paddle wheel, auger, or trommel. In another example, ingredients may be metered out by cutting, e.g., from a stock of potatoes in the metering device 220. Ingredients may be weighed using a load cell or other scale, which in some examples may be attached to or in communication with a release door configured to drop measured ingredients into one of the baskets 224. In still other examples, pre-loaded baskets may be loaded into the metering device 220. The metering device may employ any combination of other features or techniques for measuring and transporting ingredients, e.g., pumps, timing, vibration, etc.

The cooking apparatus 201 may be configured to transport metered ingredients from the metering device 220 to cooking devices 206a and/or 206b. As illustrated, a plurality of conveyors 226 may be provided, which generally transport baskets 224 of ingredients to the cooking devices 206. Multiple conveyors 226 may be provided, as shown in FIG. 12, such that a first one of the conveyors 226 may transport a basket 224 from metering device 220 to a cooking device 206, while another conveyor 226 returns an empty basket 224 to a position near the metering device, i.e., to allow the metering device 220 to measure out additional ingredients into the basket 224.

The conveyors 226 may transport baskets 224 to lifts 228, each of which are configured to lift the baskets 224 from either conveyor 226 and raise the baskets 224 to an elevated position sufficient to allow the baskets 224 to be placed above one of the cooking devices 206. The baskets 224 may be hooked onto the lift(s) 228 or may be actively grabbed, e.g., with an end effector such as end effector 128 described above. As illustrated, two lifts 228 are provided, thereby allowing an empty basket 224 to be returned while another basket 224 containing food ingredients, e.g., frozen french fries, is transported to a cooking device 206. Any mechanism for the lifts 228 may be employed to facilitate transport of baskets 224 up and down between the conveyors 226 and an elevated position, i.e., above the cooking devices 206. For example, as illustrated in FIG. 12, the lifts 228 may move vertically along rails 230, e.g., using a chain, pulley, or other drive mechanism (not shown).

While conveyors and lifts are illustrated in FIG. 12 for transporting ingredients to an elevated position above the cooking devices 206, any other devices or methods of transporting ingredients from metering device 220 may be employed that is convenient. Merely by way of example, in other approaches a chain drive, vibration, gravity, or rollers may be utilized. In still another example, baskets 224 or other containers for food ingredients may be manipulated or transported by way of magnets (not shown).

Upon movement of food ingredients to an elevated position above the cooking device(s) 206, horizontal movement of the food ingredients to the cooking device(s) 206 may be executed in any manner that is convenient, including various automated processes elaborated further below. In some example approaches, automation facilitates transport of food ingredients above or over a top of cooking device(s) 206, from where baskets 224 and/or food ingredients may be moved vertically to bring food ingredients into the cooking oil or other medium of the cooking device(s) 206.

In an example illustrated in FIG. 12, horizontal rails 232 may transport baskets 224 to a position over a given cooking device 206, from which the baskets 224 may be submerged in the oil or other cooking medium of the cooking device 206. A crane 234, elevator, or the like may be moveable along the rail(s) 232 and configured to grasp/release the baskets 224 to facilitate delivery of food ingredients to the cooking device(s) 206. The baskets 224 may be positively engaged, e.g., using a conveyor, gripper, magnet, or the like, or may be released upon automated platforms (not shown) or other components of the cooking devices 206 which lower/raise the baskets 224 into the cooking oil. Heat shielding may be provided with respect to more sensitive automated components, e.g., to manipulate flow of high temperature air from the heated cooking medium, cooking process, etc.

Other approaches to providing horizontal movement of food ingredients to cooking device(s) 206 are possible. For example, a gantry-style device may transport food ingredients from vertical rails 230 to cooking device(s) 206. In another example approach, a roller-coaster style track may allow for automated transport of baskets 224 and/or food ingredients to the cooking device(s) 206. In some such examples, out-of-plane motion of the baskets 224 on tracks of a roller-coaster style transport may facilitate dumping or rotation of baskets 224 to deposit food ingredients to a cooking device 206. In another approach, an end effector (not shown) of the automation can rotate and/or grip baskets 224 or other containers. In still another example, an end effector of automation for transporting food ingredients to a cooking device may allow passive rotation of a basket 224 or other container, e.g., by way of gripping the basket or other transport container, and a bumper or other obstruction/object contacting the basket below a center of gravity of the basket/container, causing rotation of the basket/container and emptying contents of the basket/container. A claw or other device may grip a container, e.g., basket 224, to facilitate such rotation or movement. In still another example, horizontal rails may passively grip baskets 224 or other containers using locks or latches, which engage the baskets/containers upon pushing the baskets/containers against the locks/latches. Bumpers or other obstructions may be used to passively rotate the gripped item. In another example, an end effector of automation employs a vertical motion to actuate a clamp configured to hold a basket 224 or other container, e.g., by urging or pushing outwardly a latch. Another example end effector of automation may passively hook onto basket 224 or other container, with a separate bumper which is employed to cam the hooks outwardly to release the basket 224. In another example, pins or solenoids may be actuated to grip basket 224 or other containers. In still another example, an actively or passively opened bottom of basket 224 may be employed to release contents of a basket 224, e.g., into a cooking device 206 and/or a finishing area 208.

As noted above, upon transport of food ingredients to the cooking device(s) 206 the cooking devices 206 may generally cook the food ingredients, e.g., by frying the food ingredients in oil, in an automated process. Subsequently, cooked food ingredients can be transported from the cooking device 206 to a finishing area 208. In some examples, the finishing area 208 includes heating elements, lamps, or other devices for keeping cooked food/ingredients, e.g., french fries, warm.

In examples of transporting food ingredients from cooking devices 206 to a finishing area 208, food ingredients may be transported horizontally, e.g., via the horizontal rails 232 illustrated in FIG. 12. Baskets 224 or other containers may be dumped, e.g., into a trommel-style cylinder configured to measure out portions of the cooked food. For example, a bracket or active grip holding the basket 224 to the horizontal rail(s) 232 may pivot or rotate to dump the contents into the finishing area 208. In another example, contents of a basket 224 may be released or dumped into finishing area 208 with a passively rotating basket 224, e.g., which pivots upon contacting a bumper (not shown).

At the finishing area 208, the cooked food may be held in a basket or other collector to allow portioning into containers, e.g., small/medium/large, or other appropriate sizes, manually by personnel. Alternatively, the finishing area 208 may have automated devices for portioning and/or seasoning cooked food ingredients. In an example, a conveyor system in the finishing area 208 may portion out contents that are seasoned, e.g., with salt, at an outfeed. In another example a finishing area 208 may be tended by one or more robots or robotic arms, e.g., a delta-style robot, a 6-degree-of-freedom arm, SCARA robot, robot swarm, or robot on a mobile platform, merely as examples. One or more finishing areas 208 may include "crisp-n-hold" cabinets in a pickup cabinet, from which personnel or customers may withdraw their cooked food.

Automated Cooking Processes

Figure 13:
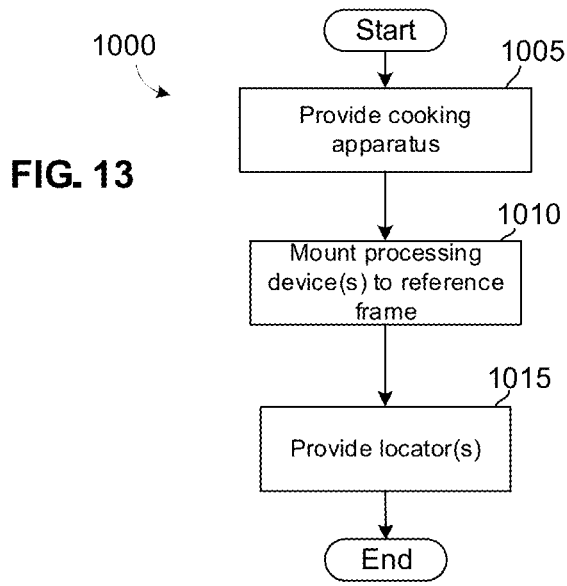
FIG. 13 shows a process flow diagram for a method of automated food preparation directed to locating a robot arm or rail, according to an embodiment of the present disclosure.

Turning now to FIG. 13, an example flow diagram is illustrated for a process 1000 directed to automated food preparation. The process 1000 may be employed to Process 1000 may begin at block 1005, where a cooking apparatus is provided that is configured to cook consumable items, e.g., food ingredients such as frozen or raw potatoes for making french fries. The cooking apparatus includes at least first and second processing devices for the consumable items. For example, as described above a cooking apparatus may include an ingredient storage 104, a cooking device 106, and/or a finishing area 108. Process 1000 may then proceed to block 1010.

At block 1010, the first and second processing devices of the cooking apparatus may be mounted to a reference frame. For example, as discussed above, frame position locators 136 may be provided for defining a location of processing devices such as ingredient storage 104, cooking device(s) 106, and/or finishing area(s) 108 with respect to a reference frame 134. More particularly, in the example illustrated in FIGS. 4-6, cooking devices 106a and 106b are fixed to reference frame 134 with frame position locator 136b.

Proceeding to block 1015, first and second locators may be provided to set a fixed horizontal relationship of a moveable base of a robot arm relative to the processing devices. For example, as noted above, in some example approaches locators such as pin 142 and/or horizontal spacers 138 may fix a rail 126 at least horizontally with respect to one or more of the processing devices in a cooking apparatus. More specifically, in the example illustrated in FIGS. 4-6, pin 142 and two horizontal spacers 138 are employed to fix rail 126 horizontally to cooking devices 106a and 106b.

In the above examples, reference frame 134 may be linked with a controller of a robot arm, e.g., robot arm 102, in which the cooking apparatus is provided. Additionally, the controller may also have a memory or storage that includes information regarding dimensions of processing devices of the cooking apparatus, e.g., cooking devices 106, ingredient storage 104, etc. Accordingly, locations of processing locations in example cooking apparatuses are known to the controller, such the controller may enact movement(s) of the robot arm 102 to move food ingredients amongst various locations in the cooking apparatus. Accordingly, the robot arm 102 is configured to determine robot arm movements to move food ingredients, food, or other consumable items to and from processing devices 104, 106, and/or 108.

Figure 14:
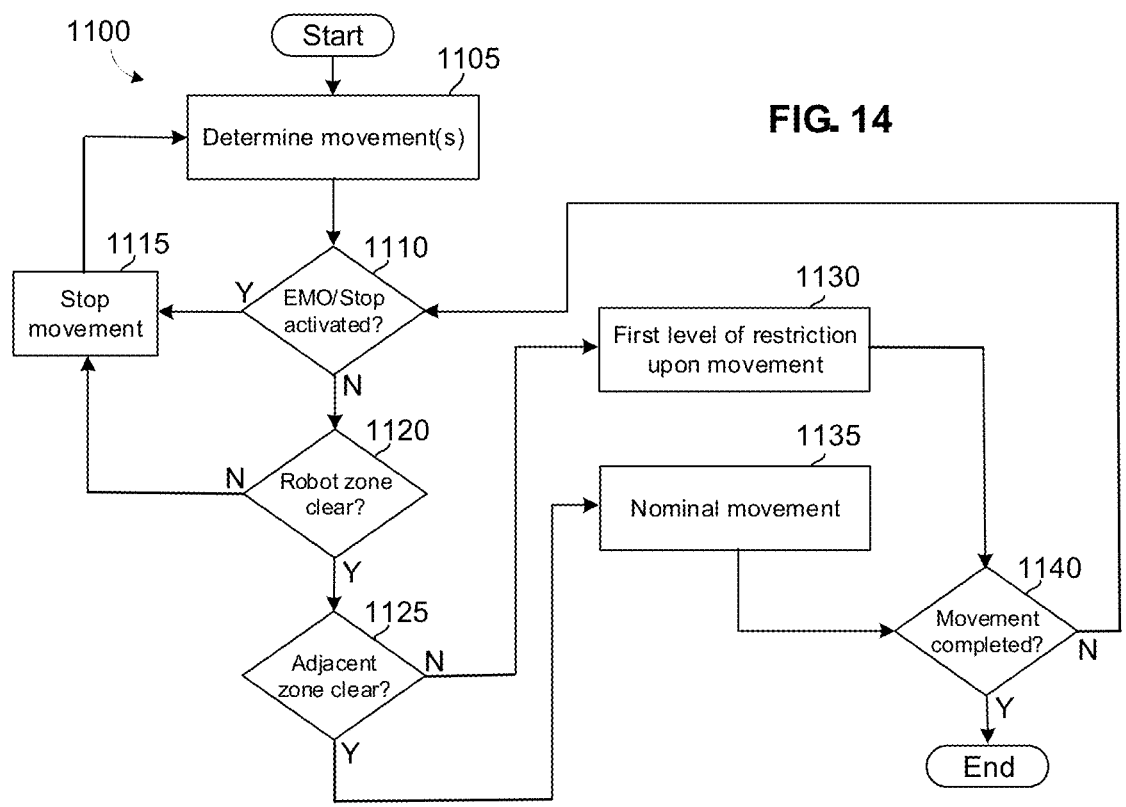
FIG. 14 shows a process flow diagram for a method of automated food preparation directed to providing robot movement zone(s) for enacting one or more restrictions on robot movement, according to an embodiment of the present disclosure.

Turning now to FIG. 14, another flow diagram of an example process 1100 for automated food preparation is illustrated and described in further detail. Generally, process 1100 employs one or more safety zones about a robot, e.g., robot arm 102 and rail 126, which may be employed to restrict or allow movement of the robot arm 102 and/or an associated movable base 124 along rail 126.

Process 1100 may begin at block 1105, where movement is initiated or determined in response to a request, e.g., from a controller of the robot arm 102 and rail 126. For example, an operator may initiate an order in response to a customer request. Process 1100 may then proceed to block 1010.

At block 1010, process 1100 may query whether an emergency or other stop switch or the like is actuated, e.g., by personnel operating a cooking apparatus. If a stop switch is actuated, process 1100 may proceed to block 1115, where movements of the base 124 along the rail 126 as well as movement of robot arm 102 are stopped.

Alternatively, if a stop switch of the robot arm 102/rail 126 has not been activated, process 1100 may proceed to block 1020. At block 1020, process 1100 may query whether movement within a robot movement zone, e.g., robot movement zone 154, has been detected. For example, as noted above scanners 184, 186, and/or 188 may be employed to determine that a human or other object has moved into the robot movement zone 154. If movement within the robot movement zone 154 has been detected, movement of the robot arm 102 and rail 126 may be stopped. Alternatively, if process 1100 determines that the robot movement zone 154 is clear, process 1100 may proceed to block 1025.

At block 1025, process 1100 may query whether an additional zone adjacent the robot movement zone 154 is clear. For example, as discussed above an intermediate zone 158 may be adjacent robot movement zone 154 and may be positioned such that any entry into the robot movement zone 154 must pass through the intermediate zone 158. In this manner, movement in the intermediate zone 158 may provide a relatively early warning of potential interference with movement of robot arm 102 and/or rail 126, at least in comparison to detecting movement solely within the robot movement zone 154.

Where process 1100 determines that the intermediate zone 158 is not clear, process 1100 may proceed to block 1130, where an initial restriction of movement is placed upon the cooking apparatus. For example, movement speed of the base 124 along the rail 126 may be reduced, e.g., such that it may not exceed a relatively reduced maximum speed. In one example, a reduced maximum speed of the base 124 along the rail 126 may be 250 millimeters/second. The robot arm 102 may still be permitted to move in accordance with a nominal setting. Accordingly, one or more components of the cooking apparatus may be reduced in speed, while not ceasing movement or stopping operations that have been initiated.

Alternatively, if process 1100 determines that the intermediate zone 158 is clear, process 1100 may proceed to block 1135, where nominal speed and/or movement settings of the robot arm 102 and rail 126 are implemented. Accordingly, if process 1100 determines that both the robot movement zone 154 and intermediate zone 158 are free of human movement or objects that might interfere with or contact robot arm 102 and/or rail 126, the robot arm 102 and rail 126 may generally move within nominal operating parameters or speeds.

Proceeding to block 1140, process 1100 may query whether movements initiated or determined, e.g., at block 1105, have been completed. If the movement(s) are complete, process 1110 may terminate. Alternatively, if the movements are not yet complete, process 1100 may proceed back to block 1110. Accordingly, process 1100 may continue to query whether restrictions should be placed upon movement of the robot arm 102 and/or rail 126 should be implemented, e.g., due to detected intrusions into the robot movement zone 154 and/or intermediate zone 158.

The foregoing is merely illustrative of the principles of this disclosure and various modifications may be made by those skilled in the art without departing from the scope of this disclosure. The embodiments described herein are provided for purposes of illustration and not of limitation. Thus, this disclosure is not limited to the explicitly disclosed systems, devices, apparatuses, components, and methods, and instead includes variations to and modifications thereof, which are within the spirit of the attached claims.

The systems, devices, apparatuses, components, and methods described herein may be modified or varied to optimize the systems, devices, apparatuses, components, and methods. Moreover, it will be understood that the systems, devices, apparatuses, components, and methods may have many applications such as monitoring of liquids other than water. The disclosed subject matter should not be limited to any single embodiment described herein, but rather should be construed according to the attached claims.

What is claimed is:

1. An automated food preparation system, comprising:
a cooking apparatus configured to cook consumable items, the cooking apparatus including at least first and second processing devices for the consumable items, the first and second processing devices mounted to a reference frame;
a robot arm extending from a moveable base configured to be mounted to the first processing device;
a first frame position locator fixed to the reference frame at a first horizontal position; and
a second frame position locator fixed to the reference frame at a second horizontal position;
wherein the robot arm is configured, based on the first horizontal position and the second horizontal position, to determine robot arm movements to move the consumable items to and from the first processing device.

2. The system of claim 1, wherein the moveable base comprises a rail, the robot arm configured to translate along the rail.

3. The system of claim 1, wherein the robot base includes one or more lifts configured to elevate the movable base from a floor surface.

4. The system of claim 1, wherein the first processing device comprises a fryer.

5. The system of claim 4, wherein the second processing device comprises one of an ingredient storage or a finishing station.

6. The system of claim 4, the cooking apparatus including a third processing device, wherein the second processing device comprises an ingredient storage, wherein the third processing device comprises a finishing station.

7. The system of claim 1, wherein the first frame position locator comprises a pin extending through a rail pinhole and a first processing device pinhole.

8. The system of claim 7, wherein the second frame position locator comprises a mounting block defining a fixed horizontal distance between the rail and the first processing device.

9. The system of claim 8, wherein the mounting block comprises a magnet, the first processing device and the rail comprising a magnetically susceptible material.

10. The system of claim 1, further comprising:
a horizontal robot arm movement zone encompassing a field of movement of the robot arm; and
at least one horizontal safety zone outside the horizontal robot zone, the robot arm configured to alter a movement of the robot arm based upon a detection of a human movement into the horizontal safety zone.

11. The system of claim 10, wherein the robot arm is configured to alter a movement speed of the robot arm based upon the detection of the human movement into the horizontal safety zone.

12. The system of claim 10, wherein the at least one horizontal safety zone includes a first horizontal safety zone and a second horizontal safety zone, second horizontal safety zone positioned between the first horizontal safety zone and the horizontal robot arm movement zone, the wherein the robot arm is configured to make first and second alterations to the robot arm movement based upon the human movement in the first and second horizontal safety zones, respectively.

13. The system of claim 12, wherein the first alteration is a reduction in robot arm movement speed, and the second alteration is a further reduction in robot arm movement speed.

14. The system of claim 13, wherein the second alteration includes a stoppage of robot arm movement.

15. The system of claim 10, wherein the robot arm is configured to increase a speed of movement of the robot arm based upon a detected exit of the human from the horizontal safety zone.

16. The system of claim 1, further comprising an end effector of the robot arm, the end effector having first and second lead-in guides, the lead-in guides each having one or more ramped surfaces to center a consumable item carrier arm.

17. The system of claim 16, wherein the end effector comprises one or more gripper paddles configured to push the consumable item carrier arm into a base of the lead-in guides.

18. The system of claim 17, wherein the one or more gripper paddles include two gripper paddles configured to contact opposing sides of the consumable item carrier arm.

* * * * *

UNITED STATES PATENT AND TRADEMARK OFFICE
CERTIFICATE OF CORRECTION

Page 1 of 1

PATENT NO. : 11,882,964 B2
APPLICATION NO. : 17/494664
DATED : January 30, 2024
INVENTOR(S) : Samuel Lewis Tanaka et al.

It is certified that error appears in the above-identified patent and that said Letters Patent is hereby corrected as shown below:

On the Title Page

In Column 1, item (73), under Assignee, Line 1, delete "Lab2Fab. LLC," and insert -- Lab2Fab, LLC, --, therefor.

In the Claims

In Column 16, Claim 12, Line 44, delete "arm movement zone, the" and insert -- arm movement zone, --, therefor.

Signed and Sealed this
Fifth Day of March, 2024

Katherine Kelly Vidal
*Director of the United States Patent and Trademark Office*